United States Patent
Kobayashi

(10) Patent No.: US 8,269,870 B2
(45) Date of Patent: Sep. 18, 2012

(54) IMAGING DEVICE FOR SUPPRESSING VARIATIONS IN ELECTRIC POTENTIALS

(75) Inventor: Takakazu Kobayashi, Sakura (JP)

(73) Assignee: Nikon Corporation, Tokyo (JP)

( * ) Notice: Subject to any disclaimer, the term of this patent is extended or adjusted under 35 U.S.C. 154(b) by 129 days.

(21) Appl. No.: 12/839,123

(22) Filed: Jul. 19, 2010

(65) Prior Publication Data

US 2010/0283880 A1 Nov. 11, 2010

Related U.S. Application Data

(63) Continuation of application No. PCT/JP2009/000178, filed on Jan. 20, 2009.

(30) Foreign Application Priority Data

Feb. 18, 2008 (JP) ................................. 2008-035799

(51) Int. Cl.
*H04N 3/14* (2006.01)
(52) U.S. Cl. ...................................................... 348/300
(58) Field of Classification Search .................. 348/300, 348/243
See application file for complete search history.

(56) References Cited

U.S. PATENT DOCUMENTS

| | | |
|---|---|---|
| 5,471,515 A | 11/1995 | Fossum et al. |
| 5,793,322 A | 8/1998 | Fossum et al. |
| 5,841,126 A | 11/1998 | Fossum et al. |
| 5,880,691 A | 3/1999 | Fossum et al. |
| 5,886,659 A | 3/1999 | Pain et al. |
| 5,887,049 A | 3/1999 | Fossum |
| 5,909,026 A | 6/1999 | Zhou et al. |
| 5,929,800 A | 7/1999 | Zhou et al. |
| 5,949,483 A | 9/1999 | Fossum et al. |
| 5,952,645 A | 9/1999 | Wang et al. |
| 5,990,506 A | 11/1999 | Fossum et al. |
| 6,021,172 A | 2/2000 | Fossum et al. |
| 6,057,539 A | 5/2000 | Zhou et al. |

(Continued)

FOREIGN PATENT DOCUMENTS

JP A 2000-077642 3/2000

(Continued)

OTHER PUBLICATIONS

International Search Report issued in corresponding International Application No. PCT/2009/000178, mailed Apr. 28, 2009. (with English-language translation).

(Continued)

*Primary Examiner* — Jason Chan
*Assistant Examiner* — Gary C Vieaux
(74) *Attorney, Agent, or Firm* — Oliff & Berridge, PLC

(57) ABSTRACT

An imaging device includes pixels arranged in a two-dimensional form and each having a photoelectric conversion part converting light into an electric signal, a plurality of vertical signal lines coupled, in a column direction, to the pixels arranged in the column direction and receiving the electric signal read from each of the pixels, a first constant current generator provided on each of the vertical signal lines, a column amplifier having a second constant current generator and amplifying the electric signal read to the vertical signal line, and a constant voltage generator provided on each of the vertical signal lines and being coupled to a first contact of the first constant current generator and a second contact of the second constant current generator included in the column amplifier.

11 Claims, 11 Drawing Sheets

U.S. PATENT DOCUMENTS

| | | | |
|---|---|---|---|
| 6,101,232 | A | 8/2000 | Fossum et al. |
| 6,107,618 | A | 8/2000 | Fossum et al. |
| 6,107,619 | A | 8/2000 | Cunningham et al. |
| 6,115,065 | A | 9/2000 | Yadid-Pecht et al. |
| 6,124,819 | A | 9/2000 | Zhou et al. |
| 6,166,768 | A | 12/2000 | Fossum et al. |
| 6,175,383 | B1 | 1/2001 | Yadid-Pecht et al. |
| 6,326,230 | B1 | 12/2001 | Pain et al. |
| 6,346,700 | B1 | 2/2002 | Cunningham et al. |
| 6,373,050 | B1 | 4/2002 | Pain et al. |
| 6,380,572 | B1 | 4/2002 | Pain et al. |
| 6,384,413 | B1 | 5/2002 | Pain |
| 6,400,824 | B1 | 6/2002 | Mansoorian et al. |
| 6,403,963 | B1 | 6/2002 | Nikzad et al. |
| 6,456,326 | B2 | 9/2002 | Fossum et al. |
| 6,476,860 | B1 | 11/2002 | Yadid-Pecht et al. |
| 6,486,503 | B1 | 11/2002 | Fossum |
| 6,515,702 | B1 | 2/2003 | Yadid-Pecht et al. |
| 6,519,371 | B1 | 2/2003 | Pain et al. |
| 6,546,148 | B1 | 4/2003 | Yadid-Pecht et al. |
| 6,549,235 | B1 | 4/2003 | Fossum et al. |
| 6,555,842 | B1 | 4/2003 | Fossum et al. |
| 6,570,617 | B2 | 5/2003 | Fossum et al. |
| 6,606,122 | B1 | 8/2003 | Shaw et al. |
| 6,665,013 | B1 | 12/2003 | Fossum et al. |
| 6,721,464 | B2 | 4/2004 | Pain et al. |
| 6,744,068 | B2 | 6/2004 | Fossum et al. |
| 6,787,749 | B1 | 9/2004 | Zhou et al. |
| 6,801,258 | B1 | 10/2004 | Pain et al. |
| 6,825,059 | B2 | 11/2004 | Fossum |
| 6,838,301 | B2 | 1/2005 | Zheng et al. |
| 6,839,452 | B1 | 1/2005 | Yang et al. |
| 6,933,488 | B2 | 8/2005 | Pain |
| 6,943,838 | B2 | 9/2005 | Fossum et al. |
| 6,944,352 | B1 | 9/2005 | Yadid-Pecht et al. |
| 6,980,230 | B2 | 12/2005 | Yadid-Pecht et al. |
| 7,002,626 | B2 | 2/2006 | Pain et al. |
| 7,019,345 | B2 | 3/2006 | Pain et al. |
| 7,053,929 | B2 | 5/2006 | Yadid-Pecht et al. |
| 7,105,371 | B2 | 9/2006 | Fossum et al. |
| 7,190,398 | B1 | 3/2007 | Yadid-Pecht et al. |
| 7,268,814 | B1 | 9/2007 | Pain et al. |
| 7,369,166 | B2 | 5/2008 | Fossum et al. |
| 8,134,622 | B2 * | 3/2012 | Kobayashi ............... 348/300 |
| 2004/0239786 | A1 | 12/2004 | Masuyama et al. |
| 2008/0030595 | A1 * | 2/2008 | Murakami et al. ......... 348/222.1 |
| 2008/0143863 | A1 | 6/2008 | Masuyama et al. |
| 2009/0033782 | A1 * | 2/2009 | Muroshima et al. .......... 348/308 |
| 2009/0140122 | A1 * | 6/2009 | Suzuki ...................... 250/201.2 |

FOREIGN PATENT DOCUMENTS

| | | |
|---|---|---|
| JP | A 2000-287131 | 10/2000 |
| JP | A 2004-312700 | 11/2004 |
| JP | A 2006-238138 | 9/2006 |

OTHER PUBLICATIONS

International Preliminary Report on Patentability issued in corresponding International Application No. PCT/JP2009/000178, issued Aug. 24, 2010. (with English-language translation).

* cited by examiner

IMAGING DEVICE FOR SUPPRESSING VARIATIONS IN ELECTRIC POTENTIALS

CROSS REFERENCE TO RELATED APPLICATION

This application is a continuation application of International Application PCT/JP2009/000178, filed Jan. 20, 2009, designating the U.S., and claims the benefit of priority from Japanese Patent Application No. 2008-035799, filed on Feb. 18, 2008, the entire contents of which are incorporate herein by reference.

BACKGROUND

1. Field

The present application relates to an imaging device that captures a subject image.

2. Description of the Related Art

In late years, video cameras and electronic cameras using a CCD type or a CMOS type imaging device become widely used. For instance, the CMOS type imaging device includes a plurality of pixels arranged in a two-dimensional matrix form of N rows by M columns and each having a photoelectric conversion part which accumulates a charge in accordance with a light amount of incident light. Further, each pixel includes transistors to output the charge accumulated in the photoelectric conversion part as an electric signal. Further, the imaging device is made up of vertical signal lines and a vertical scanning circuit for reading the electric signals output from the respective pixels for each of the rows, a horizontal output circuit for outputting the electric signals to the outside of the imaging device in a row direction in the order of columns, and the like.

The charge accumulated in the photoelectric conversion part (photodiode) is transferred to an FD (floating diffusion) part. The charge transferred to the FD part is amplified by an amplification transistor and then selected by a selection transistor specifying an address of each pixel, and is read to a vertical signal line on which a source follower circuit is formed by a constant current generator. The electric signal read to the vertical signal line is input to a column amplifier via a coupling capacitor. At this time, a dark signal when light is shielded in which the charge of the FD part is reset is held in a dark signal accumulation part, and an image signal when subject light is incident is held in an image signal accumulation part. Further, a difference between the dark signal held in the dark signal accumulation part and the image signal held in the image signal accumulation part is obtained and output from the imaging device. The circuit is called as a correlated double sampling (CDS) circuit which is capable of obtaining a preferred output by removing noise ascribable to dispersion of the circuits (refer to Patent Document 1: Japanese Unexamined Patent Application Publication No. 2000-077642, for instance).

However, in the conventional CMOS type imaging device, grounds of constant current generators disposed on output terminals of the respective vertical signal lines, grounds of constant current generators inside column amplifiers, and grounds of pixels on the respective columns are coupled to a ground line disposed in the row direction at positions on the respective columns. Due to a structure of a mask pattern at the time of manufacturing a semiconductor, the ground line disposed in the row direction is provided with external ground points on left and right ends thereof (left and right ends of the chip), and is coupled to an external ground electrical potential at the external ground points. However, when an imaging device of a relatively large size is used, since a row length is large, a total length of the ground line becomes several tens of milli-orders. Further, operational currents of output circuits of several thousands of vertical signal lines disposed on the respective columns in a parallel manner flow into the ground line, which causes a problem such that an electrical potential difference is generated on the ground line among the column positions.

Further, since grounds of the FD parts of the respective pixels (grounds of pixels) are coupled to ground lines for the pixels disposed in a vertical direction starting from the respective column positions on the aforementioned ground line disposed in the row direction, so that ground electrical potentials of the FD parts of the respective pixels also have an electrical potential distribution in a horizontal direction in which the electrical potentials vary among the columns. Note that the FD part of each of the pixels is reset based on a power supply voltage VDD, and the dark signal and the image signal are also set to be generated based on the reset electrical potential, so that even if a difference is generated among the ground electrical potentials of the FD parts of the respective pixels, no affection is imposed on output signals if there is no temporal change, namely, if a temporally constant state is provided.

However, when a high luminance subject such as illumination is image-formed on a two-dimensionally arranged effective pixel area, outputs of pixel amplifiers (amplification transistors) on a row on which the high luminance subject is image-formed become excessive, and the electrical potential of the vertical signal line becomes lower than an overdrive voltage necessary for operating the constant current generator. As a result of this, the constant current generators on the respective columns cannot maintain a constant current, which reduces a value of current flowing into the ground line.

Further, since the column amplifier is also saturated, an operating point electrical potential of a constant current generator (common current generator) inside the column amplifier is also lowered. As a result of this, a current of the common current generator in the column amplifier is also slightly lowered.

For instance, when the high luminance subject has a size of several hundreds to several thousands of columns, even if the decrease in current flowing though each of the vertical signal lines is several μA, the total decrease in current becomes several mA to several tens of mA. Accordingly, if the row on which the high luminance subject is image-formed is selected, an electrical potential of ground line when the image signal is read becomes slightly lower, by an order of several tens to several hundreds of μV, than an electrical potential of ground line when the dark signal is read. As a result of this, there is generated a slight level difference between the electrical potential of ground line for the dark signal of the row in which the high luminance subject exists and the electrical potential of ground line for the dark signal of the adjacent row in which the high luminance subject does not exist. The level difference becomes a difference in the ground electrical potentials of the FD parts of the respective pixels, so that a slight difference is generated between the outputs of the dark signals. As a result of this, a white smear is generated on both sides of the high luminance subject of the image to be shot.

For instance, in an image of street light at night in which an illumination part is extremely bright and a background is extremely dark, even if an electrical potential difference of the FD parts is very small, it is visually recognized, in the shot image, as a visually recognizable level of smear in a horizontal direction.

A proposition of the present application is to provide an imaging device capable of obtaining an image with high picture quality with no smear even when a high luminance subject exists, by suppressing a variation in electrical potentials of ground line caused by a variation in currents of constant current generators and common current generators in column amplifiers disposed on respective columns to stabilize the ground line disposed in a row direction and ground electrical potentials of pixels coupled to the ground line for each of the columns.

SUMMARY

An imaging device includes pixels arranged in a two-dimensional form and each having a photoelectric conversion part converting light into an electric signal, a plurality of vertical signal lines coupled, in a column direction, to the pixels arranged in the column direction and receiving the electric signal read from each of the pixels, a first constant current generator provided on each of the vertical signal lines, a column amplifier having a second constant current generator amplifying the electric signal read to the vertical signal line, and a constant voltage generator provided on each of the vertical signal lines and being coupled to a first contact of the first constant current generator and a second contact of the second constant current generator included in the column amplifier.

In addition, there are further provided a virtual ground line disposed in a row direction across all columns of the pixels arranged in the two-dimensional form and to which the first contact of the first constant current generator, the second contact of the second constant current generator included in the column amplifier, and a pixel ground line of the pixels in the column direction are coupled for each of the columns, a reference voltage line disposed in the row direction across all the columns of the pixels arranged in the two-dimensional form and applying a predetermined electrical potential to the constant voltage generator, and a power line disposed in the row direction across all the columns of the pixels arranged in the two-dimensional form and supplying power to the constant voltage generator, in which the power line, the virtual ground line, and the reference voltage line are coupled to the constant voltage generator for each of the columns.

Particularly, the constant voltage generator is a differential voltage follower circuit.

Further, an output load current generator of the differential voltage follower circuit is the first constant current generator.

Moreover, an output load current generator of the differential voltage follower circuit is the second constant current generator included in the column amplifier.

A ground electrical potential of pixel to be a reference level of a signal is kept constant regardless of column positions of the pixels, so that even when a high luminance subject exists in a shot image, an electrical potential difference of the ground electrical potentials among the pixels which causes a smear is reduced, resulting in that an image with no horizontal smear can be obtained. Further, since there is no need to particularly reduce a resistance of ground line, a degree of freedom in designing a pattern of an imaging device is increased, and a chip size can be reduced.

DETAILED DESCRIPTION OF THE EMBODIMENTS

Hereinafter, respective embodiments of an imaging device according to the present invention will be specifically described with reference to the drawings.

First Embodiment

Figure 1:
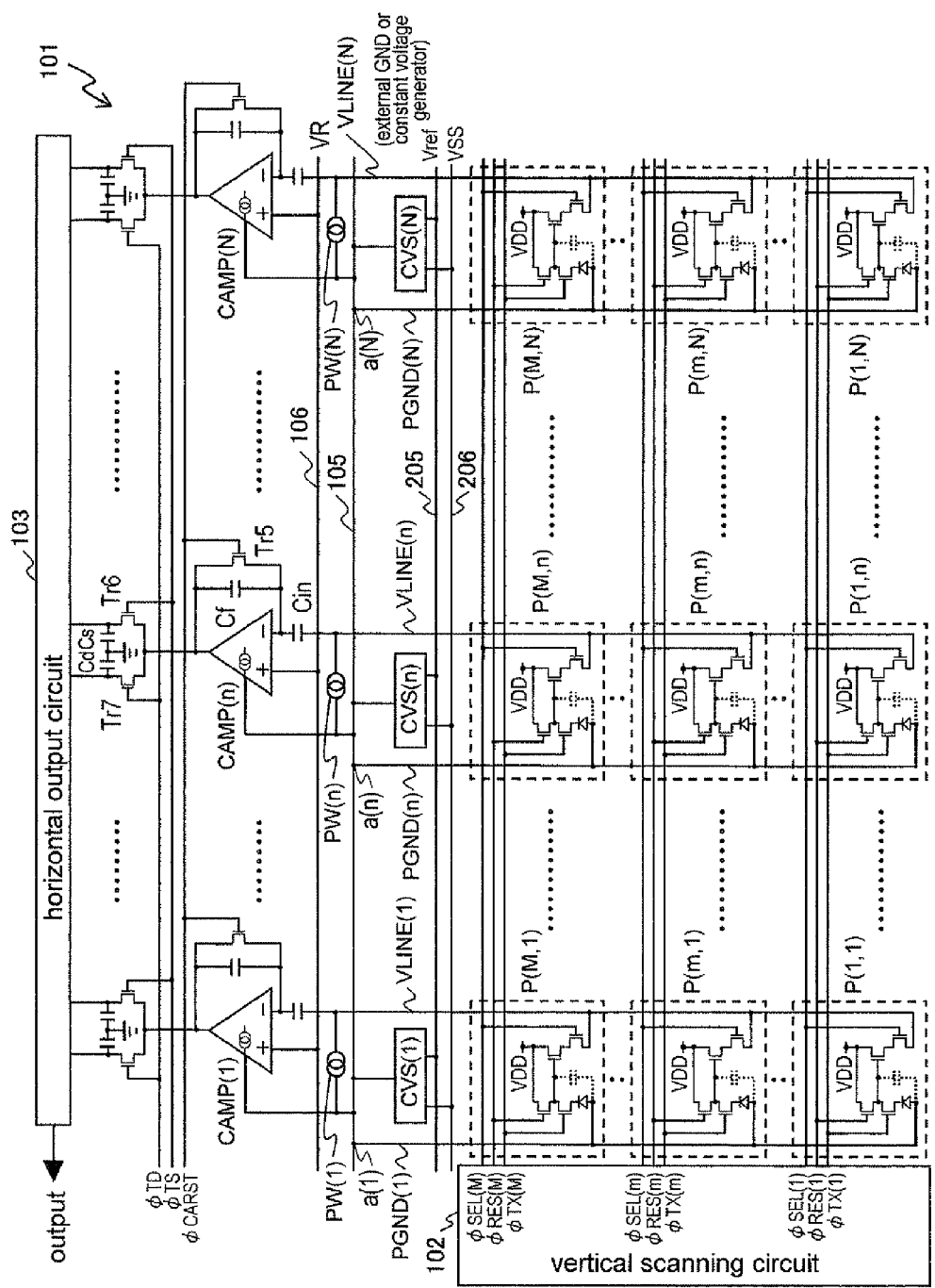
FIG. 1 is a block diagram of an imaging device 101 according to a first embodiment.

FIG. 1 is a block diagram showing an imaging device 101 according to a first embodiment. The imaging device 101 includes M×N number of pixels P(x,y), vertical signal lines VLINE(y), constant current generators PW(y), column amplifiers CAMP(y), a vertical scanning circuit 102, a horizontal output circuit 103, and micro constant voltage generators CVS(y). Here, x is a natural number of 1 to M and denotes a row number, and y is a natural number of 1 to N and denotes a column number. The M×N number of pixels P(x,y) form an imaging part of the imaging device 101, and are arranged in a matrix form of M rows by N columns.

Signals read from the respective pixels P(x,y) are read to the vertical signal lines VLINE(y) corresponding to respective columns. Further, on the vertical signal line VLINE(y) of each column, a constant current generator PW(y) forming a source follower circuit is disposed on each of the columns. Note that grounds of the respective pixels P(x,y) are coupled to pixel ground lines PGND(y) disposed in a column direction for the respective columns. Further, the pixel ground lines PGND(y) are coupled to a virtual ground line 105 disposed in the row direction and having a length which corresponds to at least a length of the row, at positions a(y) on the respective columns. Further, a reference voltage VR is applied to positive input terminals of the column amplifiers CAMP(y) through a reference voltage line 106.

Next, circuits of the respective parts shown in FIG. 1 will be described. Note that the micro constant voltage generator CVS(y) will be described later in detail.

The vertical scanning circuit 102 outputs timing signals for reading signals of the pixels P(x,y) to the vertical signal lines VLINE(y) disposed on the respective columns in units of rows. For example, in the m-th row, a timing signal φSEL(m), a timing signal φRES(m), and a timing signal φTX(m) are given to all the pixels of the entire N column from the pixel P(m, 1) to the pixel P(m,N). Note that these timing signals will be described later in detail.

Figure 2:
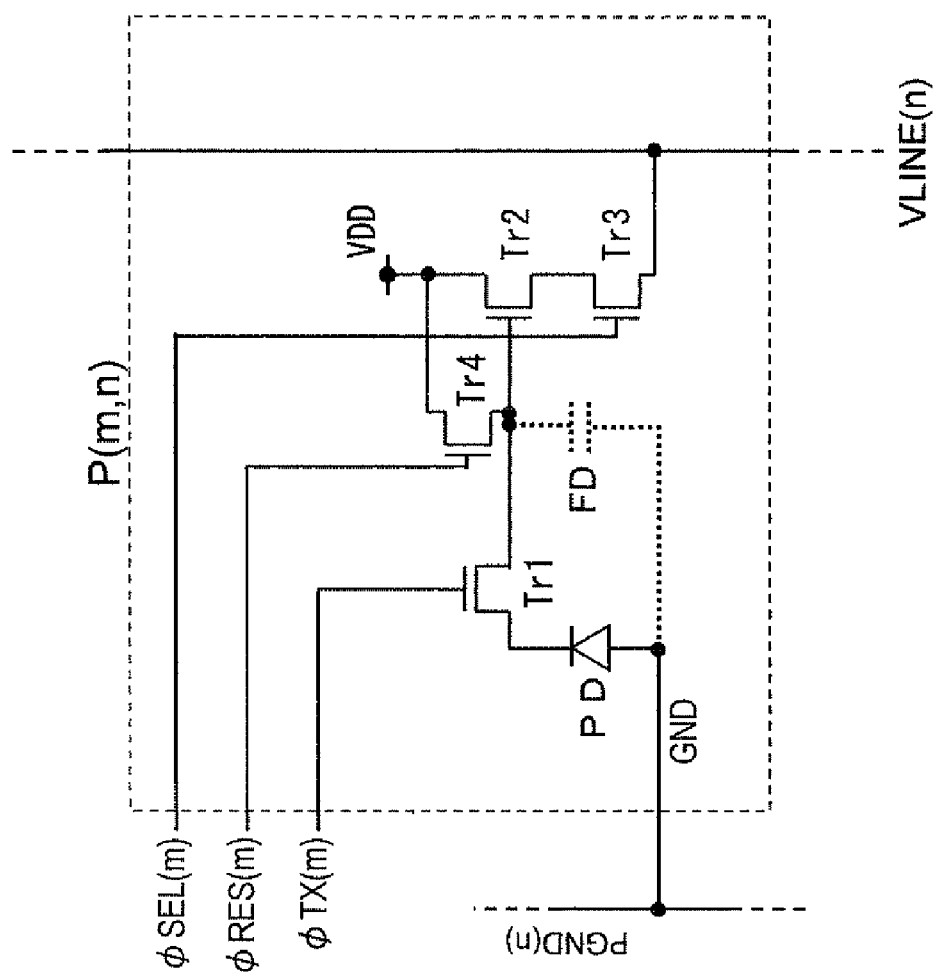
FIG. 2 is a circuit diagram of a pixel P(m,n).

Here, a structure of the pixel P(x,y) will be described using FIG. 2. FIG. 2 shows a circuit diagram of the pixel P(m,n) in the m-th row and n-th column. Note that each of the M×N number of pixels P(x,y) has the same circuit structure. In FIG. 2, the pixel P(m,n) includes a photodiode PD, a transfer transistor Tr1, an amplification transistor Tr2, a selection transistor Tr3, and a reset transistor Tr4. Incidentally, VDD denotes a power supply, GND denotes a ground, and FD denotes a floating diffusion part (floating diffusion region). Further, the timing signal φSEL(m), the timing signal φRES(m), the timing signal φTX(m), and the vertical signal line VLINE(n) are the same as those in FIG. 1. The ground GND of the pixel P(m,n) is coupled to a pixel ground line PGND(n).

In FIG. 2, light incident on the photodiode PD is photoelectrically converted and accumulated as a charge. When the timing signal φTX(m) is input to a gate of the transfer transistor Tr1, the charge accumulated in the photodiode PD is transferred to the FD part and is amplified by the amplification transistor Tr2. The signal amplified by the amplification transistor Tr2 is read to the vertical signal line VLINE(n) when the timing signal φSEL(m) is input to a gate of the selection transistor Tr3. Note that when the timing signal φRES(m) is input to a gate of the reset transistor Tr4, the FD part is reset to a reset voltage (VDD−Vt−ΔVt). Here, Vt denotes a threshold voltage, and ΔVt denotes an amount of variation due to a back-gate effect. Note that operations of the respective timing signals will be described later in detail.

The signals of the pixels P(x,y) are thus read to each of the corresponding vertical signal lines VLINE(y), and are then input to the column amplifiers CAMP(y) disposed on the respective columns.

Here, the signal read to the vertical signal line VLINE(n) in FIG. 2 will be described. The signal read to the vertical signal line VLINE(n) is an image signal containing optical information of a shot image or a dark signal containing a noise component before accumulating the image signal read from the pixel P(m,n). The subject light incident on the photodiode PD is photoelectrically converted into a charge in the photodiode PD. The charge is transferred to the FD part by the transfer transistor Tr1, and an electrical potential corresponding to the charge is applied to a gate electrode of the amplification transistor Tr2. The image signal is a signal read at this time to the vertical signal line VLINE(n) via the selection transistor Tr3. Meanwhile, the dark signal is a signal when the charge held in the FD part is reset by the reset transistor Tr4 and the electrical potential of the FD part is read to the vertical signal line VLINE(n) via the amplification transistor Tr2 and the selection transistor Tr3. Here, the electrical potential of the FD part has a value corresponding to a value of ground GND of the pixel coupled to the pixel ground line PGND(n).

As described above, the image signal or the dark signal is read to the vertical signal line VLINE(n) from the pixel P(m,n), and is input to the column amplifier CAMP(n). Note that although the description is made with respect to the pixel P(m,n) in this case, the same applies to the other pixels P(x,y).

In FIG. 1, the column amplifiers CAMP(y) are provided on the respective columns, and amplify the signals read to the vertical signal lines VLINE(y) on the respective columns. Here, explanation will be made on the column amplifier CAMP(n) of the n-th column.

The column amplifier CAMP(n) in FIG. 1 includes a capacitor Cf and a capacitor Cin and is an inverting amplifier with a gain determined by a ratio of capacitance values of these capacitors. Further, a source and a drain of an amplifier reset transistor Tr5 are coupled to both ends of the capacitor Cf of a feedback circuit of the column amplifier CAMP(n). A charge accumulated in the capacitor Cf is discharged and reset by giving a timing signal φCARST to a gate of the transistor Tr5. Note that this imaging device 101 accumulates the dark signal read from the pixel after the reset in the capacitor Cin and then reads the image signal. Accordingly, the column amplifier CAMP(n) subtracts the dark signal from the image signal at the time of reading the signals, to thereby remove dispersion among pixels of the column.

An output of the column amplifier CAMP(n) is coupled to drains of an image signal accumulating transistor Tr6 and a dark signal accumulating transistor Tr7. When the column amplifier CAMP(n) is reset and a timing signal φTD is then input to a gate of the dark signal accumulating transistor Tr7, the dark signal accumulating transistor Tr7 turns on, and a capacitor Cd is charged until becoming an output voltage of the column amplifier CAMP(n). When the image signal is read from the pixel and a timing signal φTS is then input to a gate of the image signal accumulating transistor Tr6, the image signal accumulating transistor Tr6 turns on, and a capacitor Cs is charged until becoming an output voltage of the column amplifier CAMP(n). A voltage of the capacitor Cs is input as the image signal and a voltage of the capacitor Cd is input as the dark signal (offset signal of the column amplifier CAMP) to the horizontal output circuit 103.

The horizontal output circuit 103 inputs the image signals accumulated in the capacitors Cs on the respective columns and the dark signals accumulated in the capacitors Cd on the respective columns, respectively, and outputs the signals to the outside in units of rows in the order of columns. At this time, to reduce dispersion in the column amplifiers CAMP(y) among the columns, the dark signals accumulated in the capacitors Cd are subtracted from the image signals accumulated in the capacitors Cs in an output differential amplifier (not illustrated) in the horizontal output circuit 103, thereby outputting a signal from which the dispersion in the column amplifiers CAMP(y) among the columns is removed, to the outside of the imaging device 101. Note that the processing to subtract the dark signal from the image signal may be performed in the imaging device 101, or the image signal and the dark signal may be output separately from the imaging device 101 so as to subtract the dark signal from the image signal externally.

Here, a series of operations until the dark signal and the image signal are read from each of the pixels P(x,y) and the respective signals are held in the capacitor Cd and the capacitor Cs on each of the columns will be described using a timing chart in FIG. 3.

Figure 3:
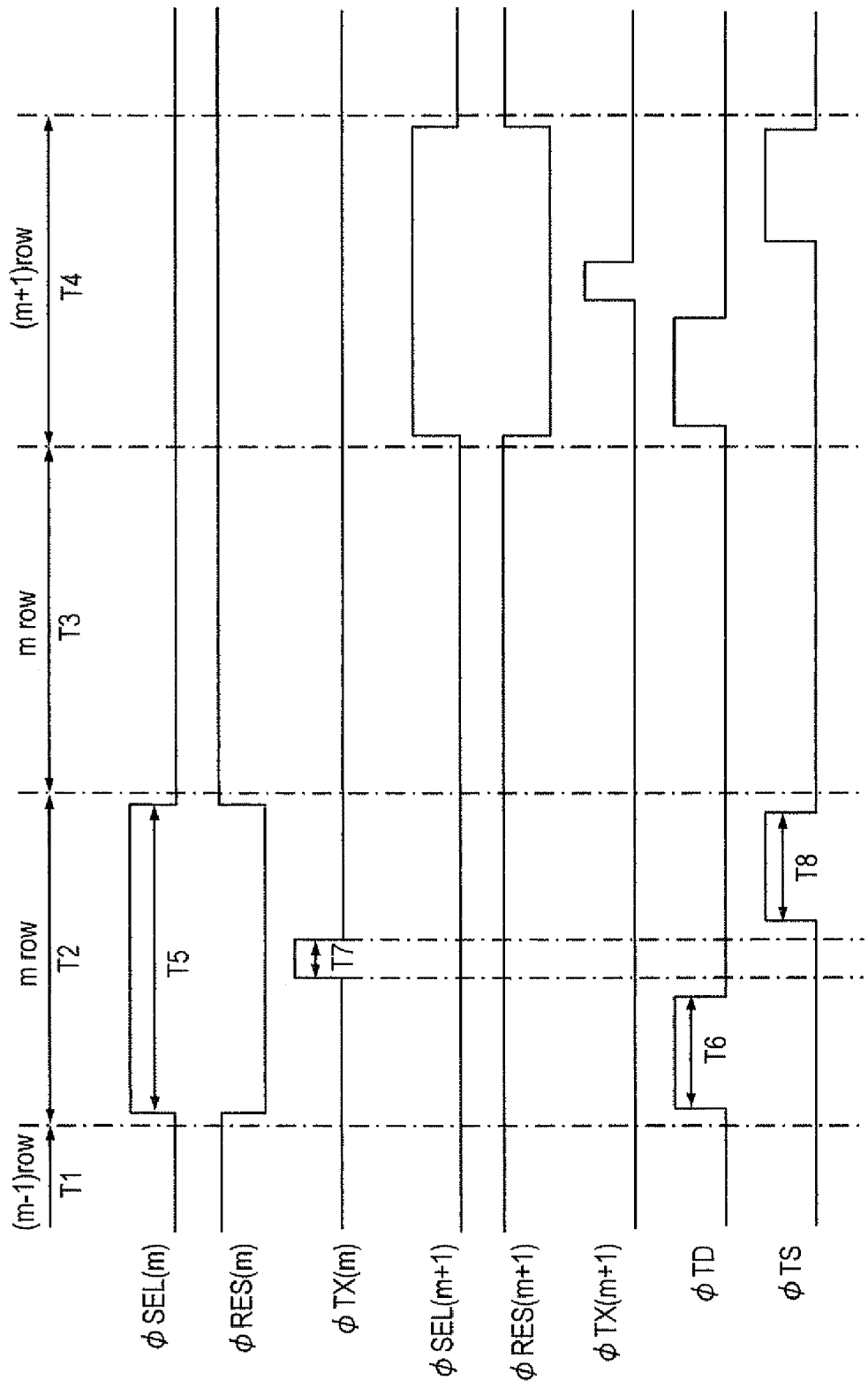
FIG. 3 is a timing chart.

FIG. 3 shows timings when the signals are read from the m-th row and the (m+1)-th row. In FIG. 3, a period T1 indicates a period during which the signals of one row read from N number of pixels P(m−1,y) of the (m−1)-th row are read from the horizontal output circuit 103 in the order of columns and are output to the outside of the imaging device 101.

The following period T2 indicates a period during which the dark signals and the image signals of one row are read from the respective pixels P(m,y) of the m-th row and the respective signals are held in the capacitors Cd and the capacitors Cs on the respective columns. At the start of the period T2, the timing signal φSEL(m) is first turned on in a period T5, and at the same time, the timing signal φRES(m) is turned off in the period T5. Since the timing signal φSEL(m) is turned on, the timing signal φTX(m) is turned off, and the timing signal φRES(m) is turned off, the charges of the FD parts at the time of the reset, namely, the dark signals are read to the vertical signal lines VLINE(y) via the amplification transistors Tr2 and the selection transistors Tr3, as described in FIG. 2.

Next, a timing signal φTD(m) is turned on in a period T6, and the dark signals read to the vertical signal lines VLINE(y) are accumulated, during the period T6, in the capacitors Cd on the respective columns via the column amplifiers CAMP(y) and the transistors Tr7 until the timing signal φTD(m) is turned off.

Next, after the timing signal φTD(m) is turned off, the timing signal φTX(m) is turned on in a period T7. During the period T7, the charges accumulated in the photodiodes PD on which the subject light is incident are transferred to the FD parts via the transfer transistors Tr1. Electrical potentials corresponding to the charges transferred to the FD parts are applied to the gates of the amplification transistors Tr2, and the image signals are output from the amplification transistors Tr2 and read to the vertical signal lines VLINE(y) via the selection transistors Tr3.

Next, a timing signal φTS is turned on in a period T8, and the image signals read to the vertical signal lines VLINE(y) are accumulated in the capacitors Cs on the respective columns via the column amplifiers CAMP(y) and the transistors Tr6 until the timing signal φTS is turned off.

When the dark signals and the image signals are respectively accumulated in the capacitors Cd and the capacitors Cs on the respective columns, the reading of the dark signals and the image signals of one row from the respective pixels P(m, y) of the m-th row is completed, and the timing signal φSEL(m) is turned off again and the timing signal φRES(m) is turned on again.

In the following period T3, the horizontal output circuit 103 reads, in the order of columns, the dark signals and the image signals of N columns of the m-th row respectively accumulated in the capacitors Cd and the capacitors Cs on the respective columns, and outputs the signals to the outside of the imaging device 101.

In the following period T4, with the use of respective timing signals φSEL(m+1), φRES(m+1), φTX(m+1) for the (m+1)-th row, similar to the respective timing signals φSEL(m), φRES(m), φTX(m) in the period T2, the dark signals and the image signals are read from the respective pixels P(m+1, y) of the (m+1)-th row, and are respectively accumulated in the capacitors Cd and the capacitors Cs on the respective columns. The dark signals and the image signals of N columns of the (m+1)-th row respectively accumulated in the capacitors Cd and the capacitors Cs on the respective columns are read by the horizontal output circuit 103 in the order of columns, and are output to the outside of the imaging device 101.

The description made so far is the one regarding the normal operation of the imaging device 101. In the imaging device 101 according to the present embodiment, the micro constant voltage generators CVS(y) are particularly disposed on the respective columns, and outputs of the micro constant voltage generators CVS(y) are coupled to the virtual ground line 105 at positions on the respective columns. Note that the position at which the output of the micro constant voltage generator CVS(y) is coupled to the virtual ground line 105, the position at which the pixel ground line PGND(y) is coupled to the virtual ground line 105, the position at which the constant current generator PW(n) is coupled to the virtual ground line 105, and the position at which the column amplifier CAMP(n) is coupled to the virtual ground line 105 are set to be close to one another. The term close means within a wiring distance in which a wiring resistance is sufficiently lowered to the extent that the electrical potential difference does not occur depending on a flowing current. It is, of course, most preferable that the respective positions are the same and the couplings are made at the same position.

Figure 4:
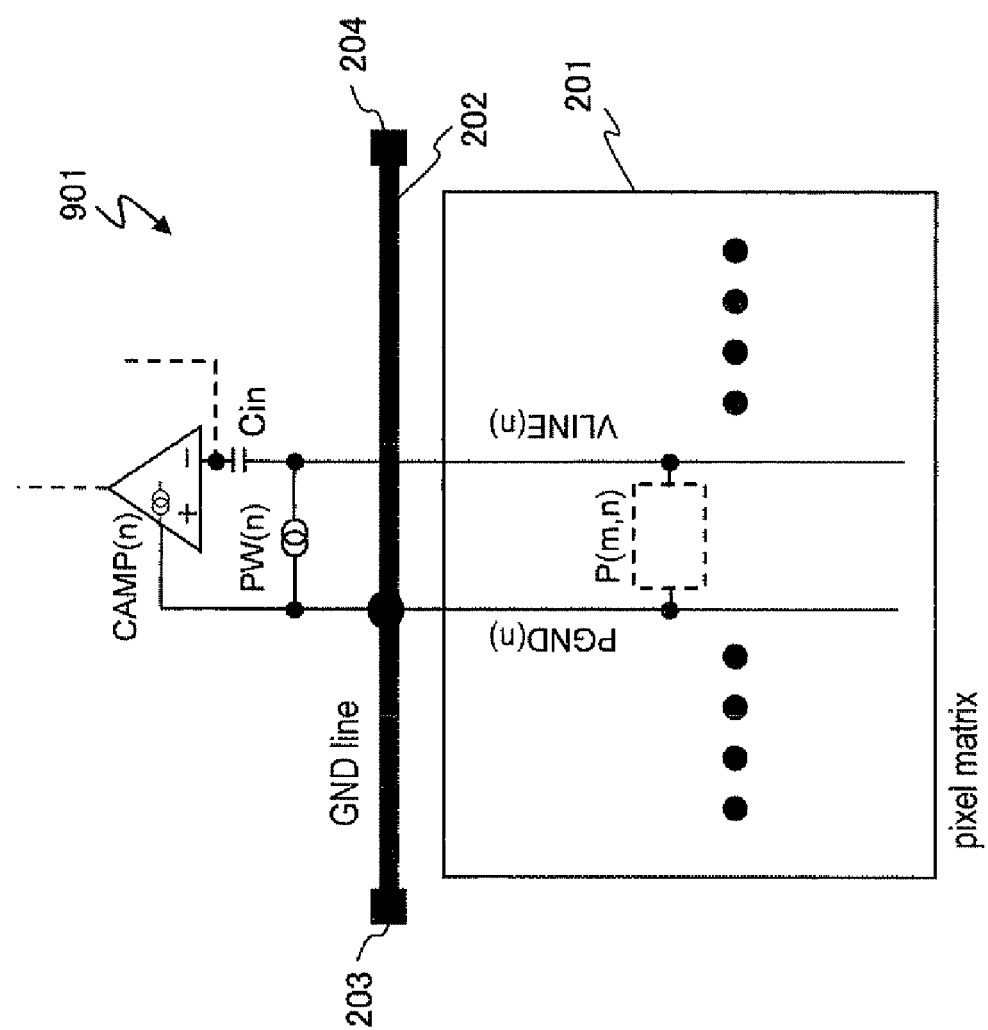
FIG. 4 is a circuit diagram of a vicinity of a ground line 202 when a micro constant voltage generator CVS(y) is not provided.

Here, for easier understanding of the characteristics of the present embodiment, explanation will be made on an imaging device 901 in which the micro constant voltage generator CVS(y) is not provided, with reference to FIG. 4. FIG. 4 is a view showing couplings among a pixel P(m,n) of a pixel matrix 201 of N rows by M columns, a vertical signal line VLINE(n) on a column of the pixel, a pixel ground line PGND(n), a constant current generator PW(n), and a column amplifier CAMP(n). Incidentally, a ground line 202 corresponds to the virtual ground line 105 in FIG. 1. Due to a structure of a mask pattern at the time of manufacturing a semiconductor, the ground line 202 is only coupled to each of external GNDs 204, 203 at both ends of the row. For this reason, in an imaging device in a unit of multimillion pixels, the number of columns becomes several thousands, and operational currents of output circuits of several thousands of vertical signal lines disposed on the respective columns in a parallel manner flow into the ground line 202, which causes an electrical potential difference depending on the column positions on the ground line 202. As a result of this, an electrical potential of the pixel ground line PGND(n) coupled to the ground line 202 for each of the columns is also varied.

Figure 5:
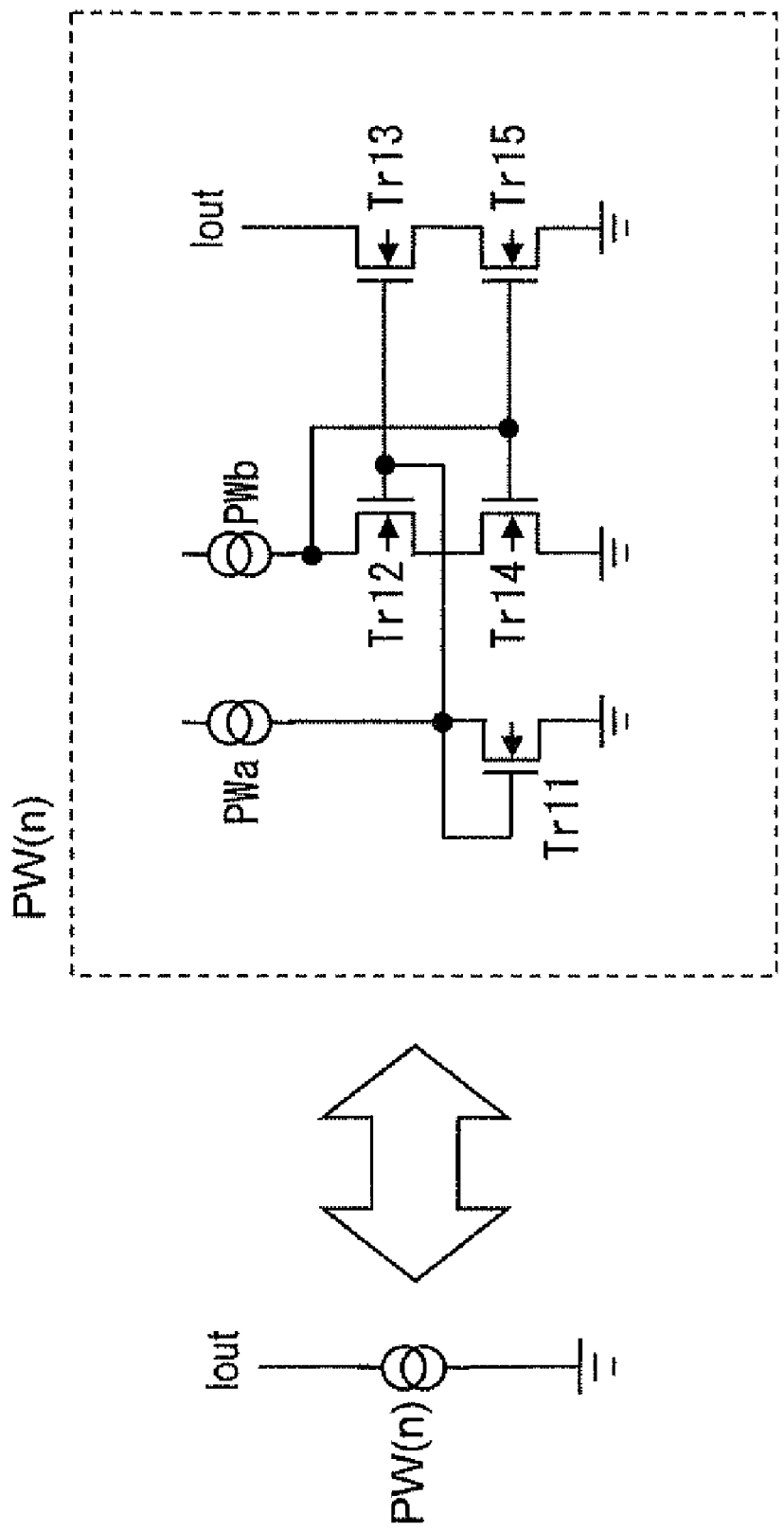
FIG. 5 is an equivalent circuit diagram of a constant current generator PW(n).

Here, an equivalent circuit of the constant current generator PW(n) and an equivalent circuit of the column amplifier CAMP(n) will be described. FIG. 5 is a view showing the equivalent circuit of the constant current generator PW(n). The constant current generator PW(n) is formed of a transistor Tr11, a transistor Tr12, a transistor Tr13, a transistor Tr14, a transistor Tr15, a constant current generator PWa, and a constant current generator PWb. The transistors Tr12, Tr13, Tr14, Tr15 form a cascade type low voltage current mirror circuit, in which a predetermined voltage formed by the transistor Tr11 and the constant current generator PWa is applied as a BIAS voltage to gates of the transistor Tr12 and the transistor Tr13 of a first stage. Accordingly, the transistors Tr13, Tr15 that form the mirror circuit together with the transistors Tr12, 14 operate to keep an output current Iout constant.

Figure 6:
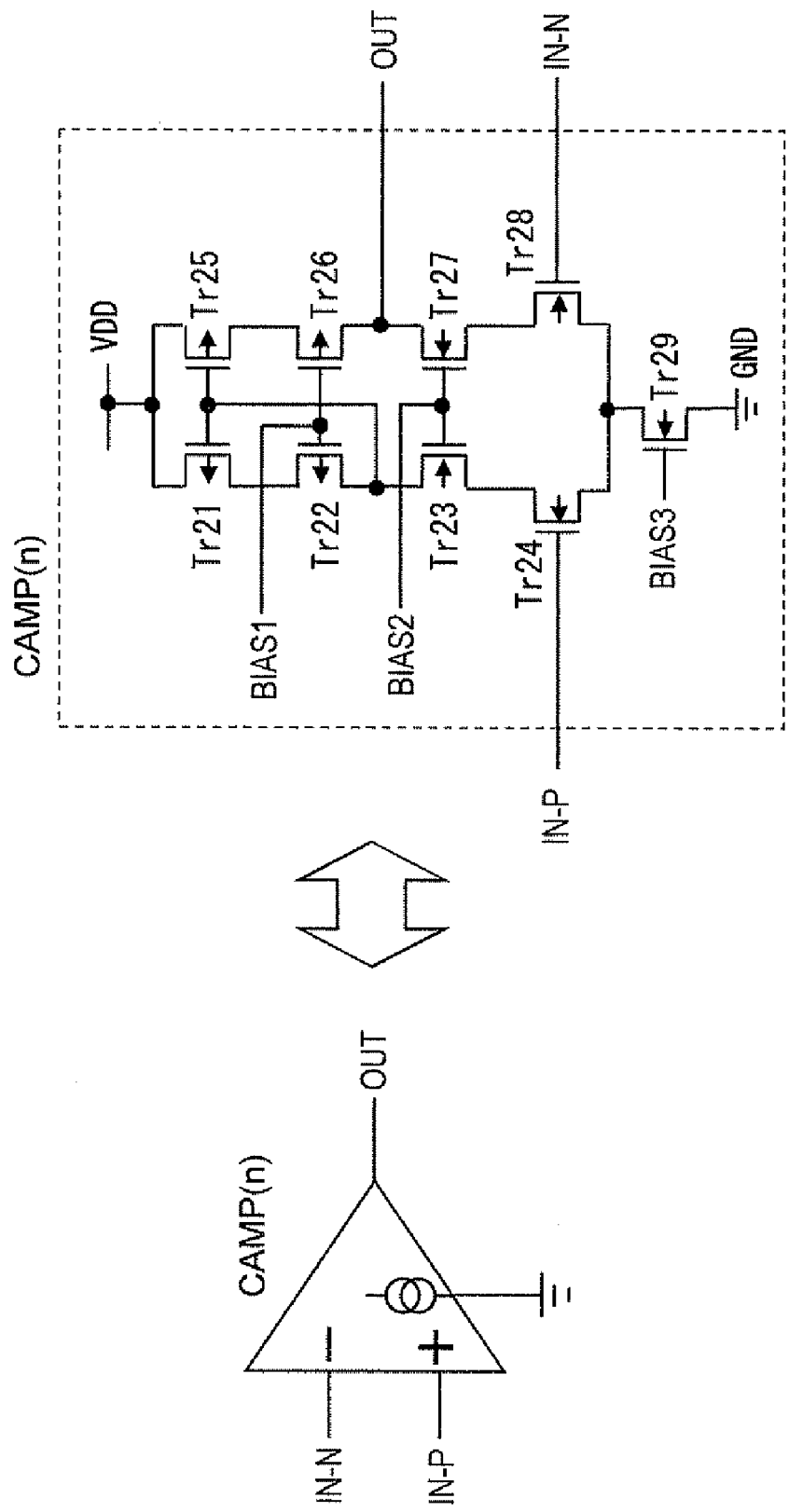
FIG. 6 is an equivalent circuit diagram of a column amplifier CAMP(n).

Next, an example of equivalent circuit of the column amplifier CAMP(n) will be shown in FIG. 6. FIG. 6 shows a circuit of a double cascade differential amplifier, in which a low voltage current mirror circuit on a load side is formed of a cascade pair of a transistor Tr21 and a transistor Tr22 and a cascade pair of a transistor Tr25 and a transistor Tr26. Likewise, a differential input cascode amplifying circuit is formed of a cascade pair of a transistor Tr23 and a transistor Tr24 and a cascade pair of a transistor Tr27 and a transistor Tr28. Each source of the transistor Tr24 and the transistor Tr28 on the differential input side is coupled to GND via a transistor Tr29 as a current generator. Further, a bias BIAS1 is given to gates of the transistor Tr22 and the transistor Tr26, a bias BIAS2 is given to gates of the transistor Tr23 and the transistor Tr27, and a bias BIAS3 is given to a gate of the transistor Tr29. A constant current is set to flow through the transistor Tr29 forming a common current generator in the column amplifier CAMP(n) of a type of double cascade differential amplifier, so that a differential voltage between a negative input IN-N and a positive input IN-P of the column amplifier CAMP(n) is amplified and output to an output OUT.

Figure 7:
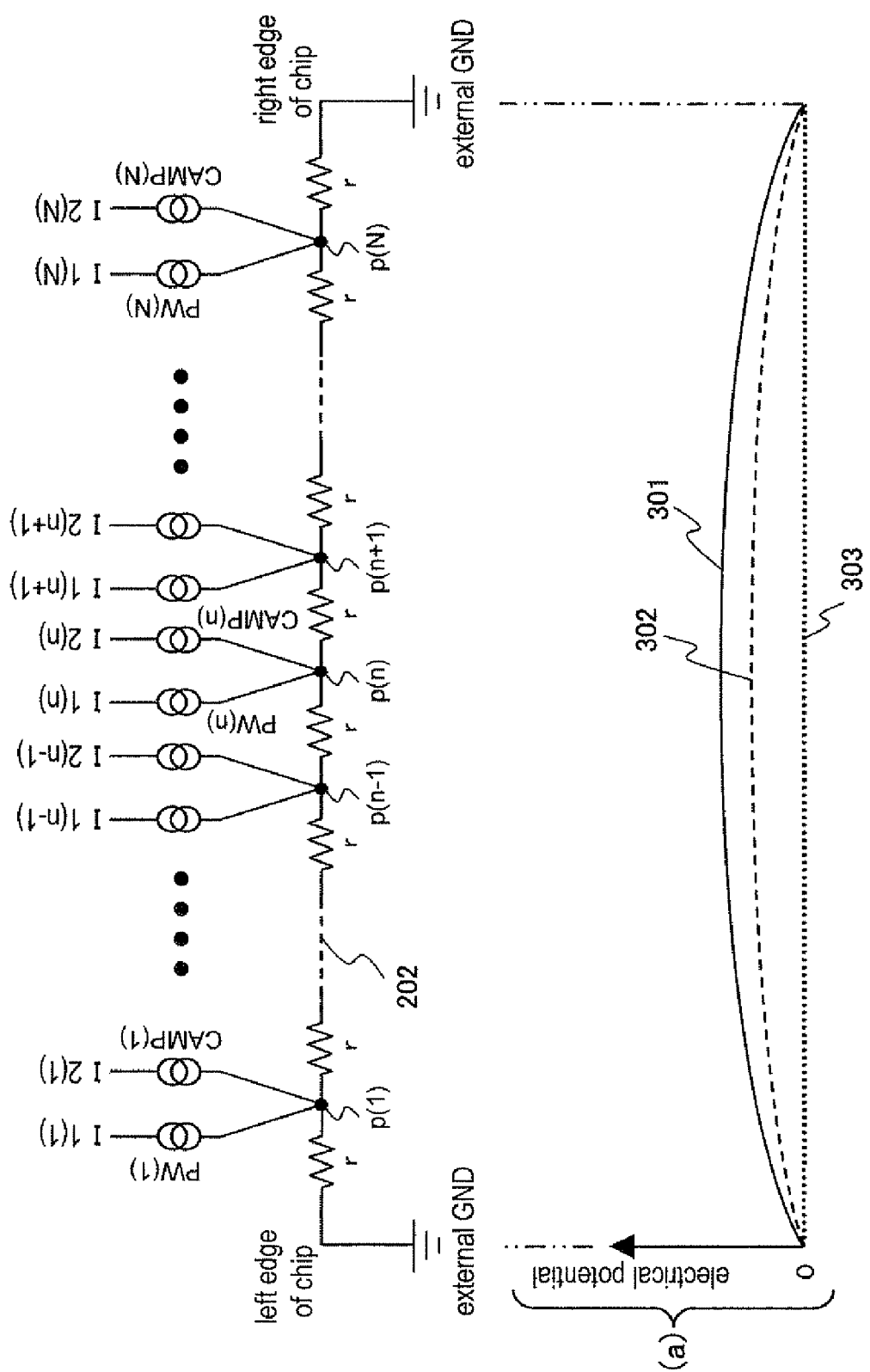
FIG. 7 is an explanatory diagram showing an equivalent circuit of the ground line 202 and a voltage distribution when the micro constant voltage generators CVS(y) are not provided.

As above, to the respective columns of the ground line 202 in FIG. 4, the constant current generators PW(y) and the common current generators in the column amplifiers CAMP(y) are coupled. Particularly, in an imaging element with a large number of pixels, several thousands of constant current generators PW(y) and common current generators in the column amplifiers CAMP(y) are coupled to the ground line 202, so that the electrical potential of the ground line 202 varies depending on the column positions. Here, a state of the variation in the electrical potential of the ground line 202 will be shown in FIG. 7. FIG. 7 shows a state of variation in the electrical potential of the conventional ground line 202 when resistances r are distributed between the columns on the ground line 202. Note that in FIG. 7, the same reference numerals as those in FIG. 1 and FIG. 4 denote the same elements. Ground points p(y) are ground points between the constant current generators PW(y) and the common current generators in the column amplifiers CAMP(y) on the respective columns. Further, the ground points p(y) are also coupling points of pixel GNDs on the respective columns. A current I1(n) and a current I2(n) denote a load current of the constant current generator PW(y) and a load current of the common current generator in the column amplifier CAMP(y), respectively.

FIG. 7(a) is a graph illustrating a variation in the voltage of the ground line 202 in the row direction, by being corresponded to the ground line 202 illustrated above. A horizontal axis indicates a position of the ground line 202 in the row direction that corresponds to the upper diagram, and a vertical axis indicates an electrical potential with respect to the external GNDs. In FIG. 7(a), both ends of the row of the ground line 202 are grounded to the external GNDs, so that the electrical potential is 0 (zero). However, an electrical potential 301 of the ground line 202 increases toward a center of the row. This is because a difference in electrical potential at the ground points p(y) of the respective columns when the load current flows through the distributed resistances r of the ground line 202 is accumulated. Note that ideally, the electrical potential should be constant at any ground point p(y) of each column, as indicated by an electrical potential 303.

Note that the FD part of each of the pixels P(x,y) is reset based on VDD, and the dark signal and the image signal are also generated based on the reset electrical potential, so that even when a difference is generated in the ground electrical potentials among the pixels, if there is no temporal change, namely, if a temporally constant state is provided, no affection is imposed on output signals since the ground electrical potentials among the pixels are offset at the time of reading the signals.

However, when a high luminance subject such as a light source is included in the effective pixel area arranged in a two-dimensional matrix form, outputs of the amplification transistors Tr2 of the pixels P(x,y) on a row on which the subject image is projected become excessive, and the electrical potential of the vertical signal line VLINE(y) becomes lower than the overdrive voltage necessary for operating the constant current generator PW(y). As a result of this, the constant current generators PW(y) on the respective columns cannot maintain a constant current, which reduces a value of current flowing into the ground line 202.

Meanwhile, since the column amplifier CAMP(y) is also saturated, an operating point electrical potential of the common current generator in the column amplifier CAMP(y) is lowered, resulting in that a current of the common current generator in the column amplifier CAMP(y) is also slightly lowered.

As a result of this, if it is set such that in FIG. 7(a), an electrical potential of the ground line 202 for the dark signal of a row in which the high luminance subject exists is an electrical potential 302, and an electrical potential of the ground line 202 for the dark signal of the adjacent row in which the high luminance subject does not exist is the electrical potential 301, for instance, the electrical potential 302 is slightly lower than the electrical potential 301, which results in generating an electrical potential difference. The electrical potential difference is transmitted to the amplification transistors Tr2 as a difference in the ground electrical potentials of the FD parts of the respective pixels P(x,y), so that a slight difference is generated between the outputs of the dark signals, resulting in that a white smear appears on both sides of the high luminance portion of the image to be finally output.

In order to reduce the electrical potential difference between the row in which the high luminance subject exists and the row in which the high luminance subject does not exist as shown in FIG. 7(a), there is a need to reduce the distributed resistances r on the ground line 202, and to achieve this, a width of the ground line 202 has to be increased. However, if the width of the ground line 202 is increased, there is generated a problem that a chip size is increased.

Therefore, in the imaging device 101 according to the present embodiment, the micro constant voltage generators CVS(y) are set to be coupled to the virtual ground line 105 for the respective columns, as shown in FIG. 1. Further, similar to the virtual ground line 105 disposed in the row direction, a VSS line that supplies negative power to the micro constant voltage generators CVS(y) on the respective columns and a Vref line that applies a reference voltage to the micro constant voltage generators are disposed in the row direction.

Figure 8:
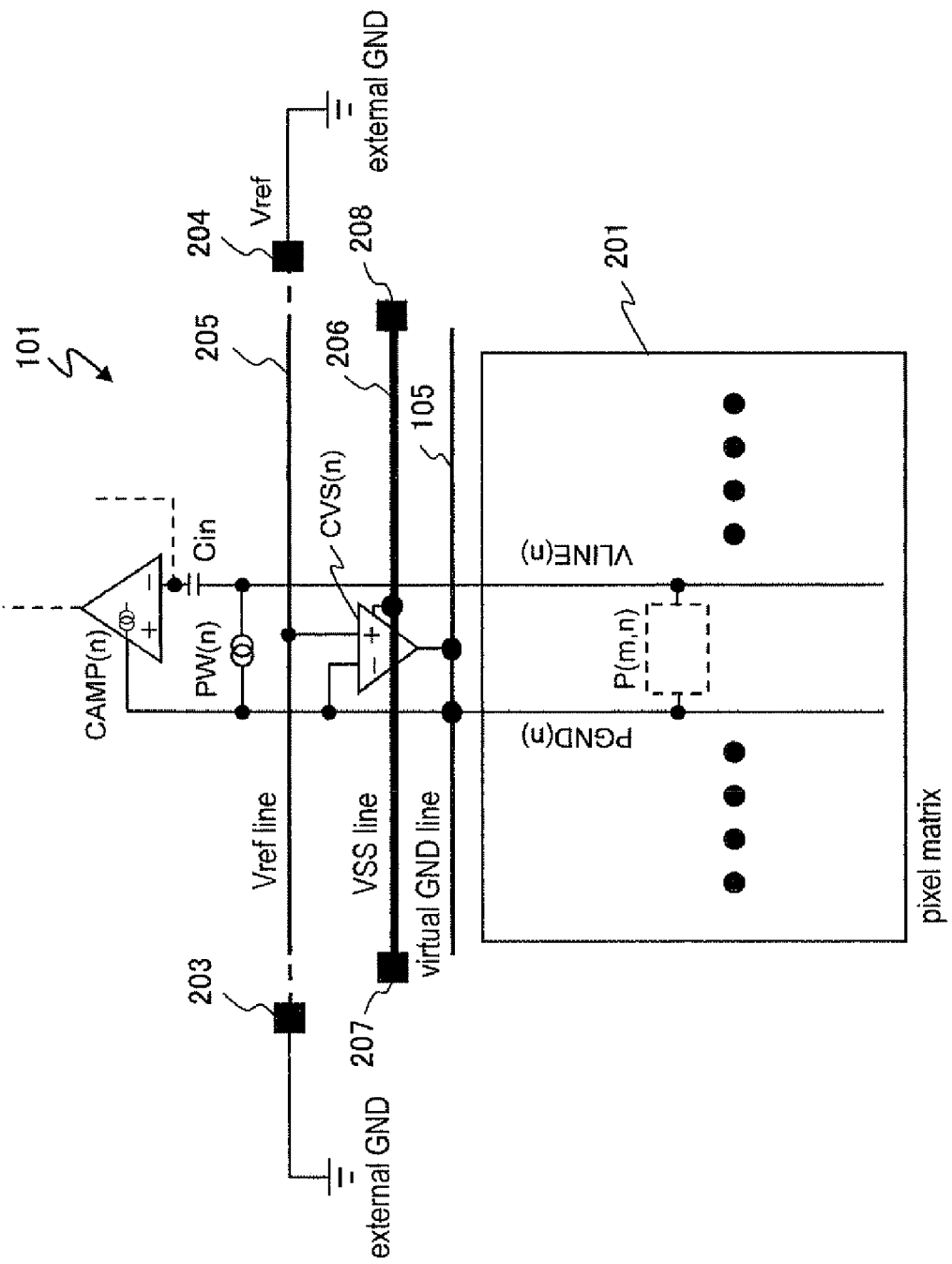
FIG. 8 is a circuit diagram of a vicinity of a ground line 105 when the micro constant voltage generator CVS(y) is provided.

FIG. 8 is a view in which circuits being characteristic parts of the imaging device 101 according to the present embodiment shown in FIG. 1 are extracted and illustrated, and is a view corresponding to FIG. 4. Note that the same reference numerals as those in FIG. 4 denote the same elements. FIG. 8 is a view showing a coupling relation among one pixel P(m,n) of the pixel matrix 201 of N rows by M columns, the vertical signal line VLINE(n) of the n-th column, the pixel ground line PGND(n) for the respective pixels of the n-th column, the constant current generator PW(n) of the n-th column, the column amplifier CAMP(n) of the n-th column, the virtual ground line 105 extending in the row direction of the pixel matrix 201, the micro constant voltage generator CVS(n) of the n-th column, a Vref line 205 that applies a reference electrical potential to the micro constant voltage generator CVS(n), and a VSS line 206 that supplies negative power to the micro constant voltage generator CVS(n). Incidentally, a VDD line that supplies positive power to the micro constant voltage generator CVS(n) is omitted. Further, an electrical potential of the external GNDs or the constant voltage generator is applied to the Vref line 205.

In FIG. 8, the micro constant voltage generator CVS(n) is an operational amplifier (differential voltage follower circuit) forming a voltage follower that applies a constant voltage output in accordance with a reference electrical potential Vref given by the Vref line 205 to a coupling point on the virtual ground line 105. Therefore, if the reference electrical potential Vref given to the micro constant voltage generator CVS(n) is set to the same ground electrical potential of the external GNDs 203, 204, the micro constant voltage generator CVS(n) operates to maintain the electrical potential of the virtual ground line 105 being an output point thereof to the electrical potential of the external GNDs. Likewise, each of the micro constant voltage generators CVS(y) of all the columns operates to maintain the electrical potential of output point thereof to the ground electrical potential. This state will be specifically described using FIG. 9.

Figure 9:
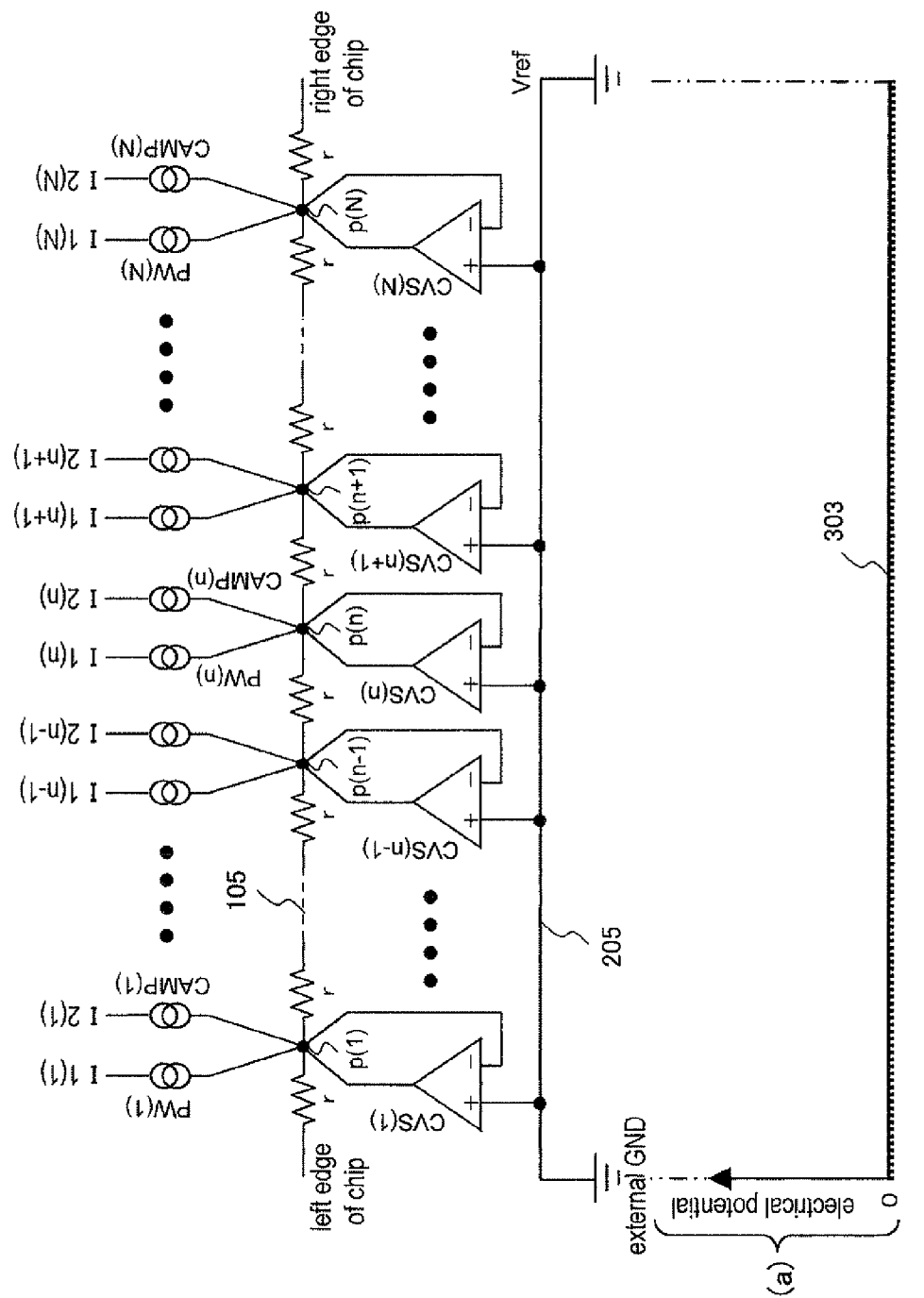
FIG. 9 is an explanatory diagram showing an equivalent circuit of the ground line 105 and a voltage distribution when the micro constant voltage generators CVS(y) are provided.

FIG. 9 is a view in which a part of the virtual ground line 105 and the micro constant voltage generators CVS(y) of the imaging device 101 according to the present embodiment is extracted and illustrated, and corresponds to FIG. 7. Further, FIG. 9(a) is a graph illustrating a variation in the voltage of the virtual ground line 105 in the row direction, by being corresponded to the virtual ground line 105 illustrated above, and corresponds to FIG. 7(*a*).

In FIG. 9, it is set such that resistances r are distributed between the columns on the virtual ground line 105, similar to the case of the ground line 202 in FIG. 7. Further, ground points p(y) are ground points between the constant current generators PW(y) and the common current generators in the column amplifiers CAMP(y) on the respective columns. Note that in FIG. 9, the same reference numerals as those in FIG. 7 denote the same elements. What differs from FIG. 7 is that outputs of the micro constant voltage generators CVS(y) are coupled to the ground points on the virtual ground line 105 of the respective columns. As described before, the micro constant voltage generator CVS(y) on each of the columns is the operational amplifier that forms the voltage follower and operates to maintain an output voltage to the electrical potential given by the Vref line 205 that applies the reference electrical potential (ground electrical potential, in the case of FIG. 9). As a result of this, the voltage of the ground point on the virtual ground line 105 of each of the columns to which the output of the micro constant voltage generator CVS(y) is coupled is maintained to the GND electrical potential, and as shown in FIG. 9(*a*), the virtual ground line 105 always has the voltage distribution that corresponds to the electrical potential distribution close to the ideal electrical potential 303, in which the variation in the electrical potential among the respective columns as indicated by the electrical potential 301 and the electrical potential 302 in FIG. 7(*a*) does not occur. Further, an electrical potential difference among the columns of the pixel ground lines PGND(y) coupled to the virtual ground line 105 for the respective columns is also eliminated.

As above, a level difference between the electrical potential of the virtual ground line 105 at the time of reading the image signals of the row in which the high luminance subject exists and the electrical potential of the virtual ground line 105 at the time of reading the image signals of the adjacent row in which the high luminance subject does not exist is eliminated, resulting in that the white smear generated on both sides of the high luminance portion can also be eliminated.

Note that since input impedances of the micro constant voltage generators CVS(y) are high and almost no current flows through the Vref line 205 that applies the reference electrical potential, a line width of the Vref line 205 may be set small. Further, since the electrical potential of the virtual ground line 105 at positions on the respective columns is stabilized by the micro constant voltage generators CVS(y), a line width of the virtual ground line 105 can be set smaller than a line width of the ground line 202 in FIG. 7. As a result of this, a chip area can be reduced, which enables to reduce a chip cost.

Figure 10:
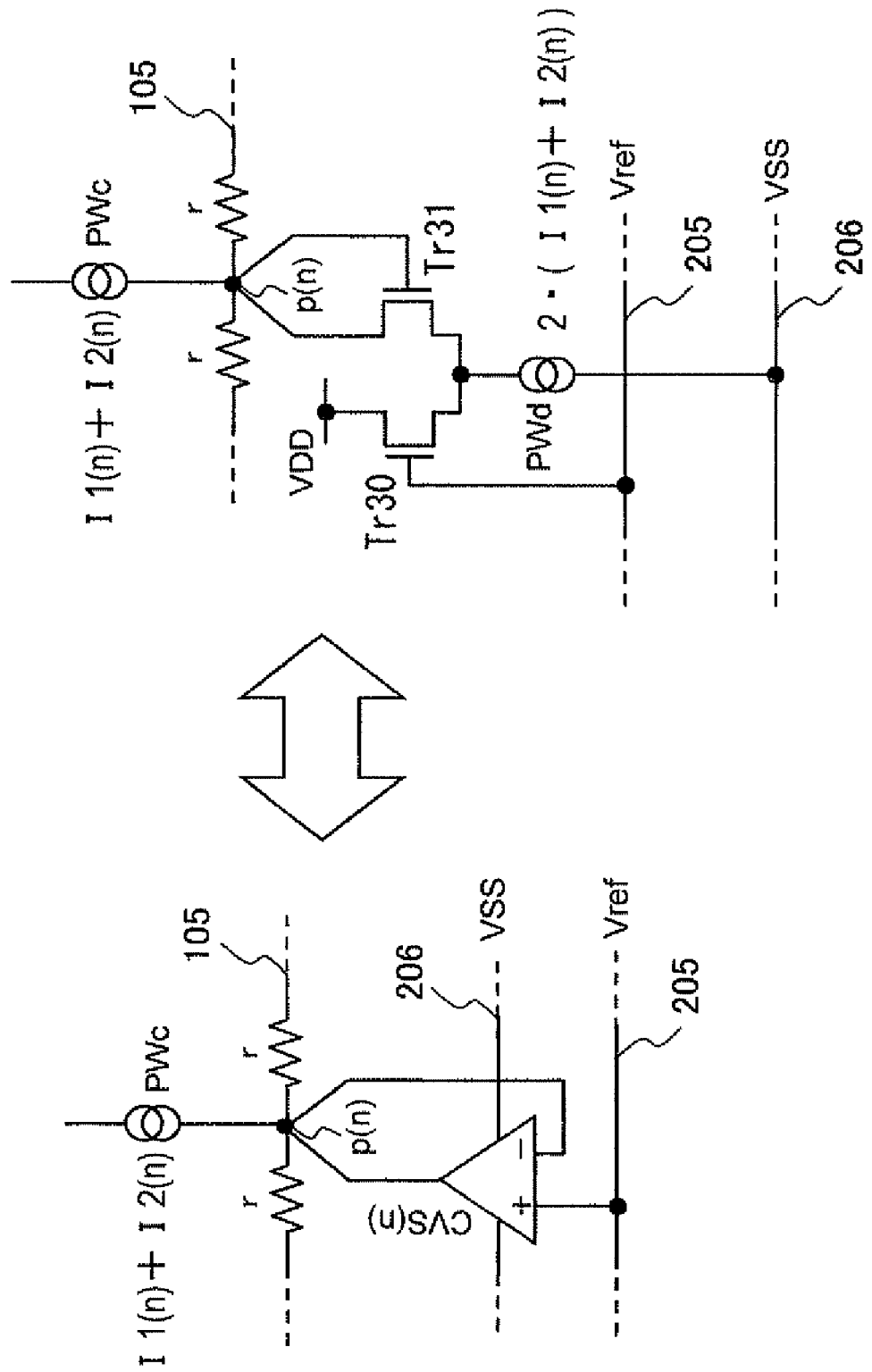
FIG. 10 is an example of equivalent circuit of the micro constant voltage generator CVS(y).

Next, an example of circuit configuration of the micro constant voltage generator CVS(y) will be described. FIG. 10 shows an example of circuit of the micro constant voltage generator CVS(n) of the n-th column. Note that the same reference numerals as those in FIG. 9 denote the same elements. Further, in FIG. 10, a load current I1(*n*) of the constant current generator PW(n) and a load current I2(*n*) of the common current generator in the column amplifier CAMP(n) of the n-th column in FIG. 9 are combined and illustrated as a constant current generator PWc of a load current (I1(*n*)+I2(*n*)), for easier understanding. Incidentally, a VDD line that supplies positive power to the micro constant voltage generator CVS(n) is omitted.

In FIG. 10, the micro constant voltage generator CVS(n) can be formed of a differential amplifier of one stage that includes a transistor Tr30, a transistor Tr31, and a constant current generator PWd. The transistor Tr30 and the transistor Tr31 form a mirror circuit, and an output electrical potential of the transistor 31 operates to be equal to the reference electrical potential Vref that is given to a gate of the transistor 30. At this time, the same load current (I1(*n*)+I2(*n*)) flows through the transistor 30 and the transistor 31, so that a current twice the load current 2·(I1(*n*)+I2(*n*)) flows through the constant current generator PWd. As above, the micro constant voltage generator CVS(n) can be realized by a simple differential voltage follower circuit, so that it becomes possible to reduce the electrical potential difference of the ground line 105 while reducing a circuit space.

Next, another example of circuit configuration of the micro constant voltage generator CVS(y) will be described using FIG. 11. Incidentally, similar to FIG. 10, FIG. 11 shows an example of circuit of the micro constant voltage generator CVS(n) of the n-th column, and the same reference numerals as those in FIG. 10 denote the same elements.

Figure 11:
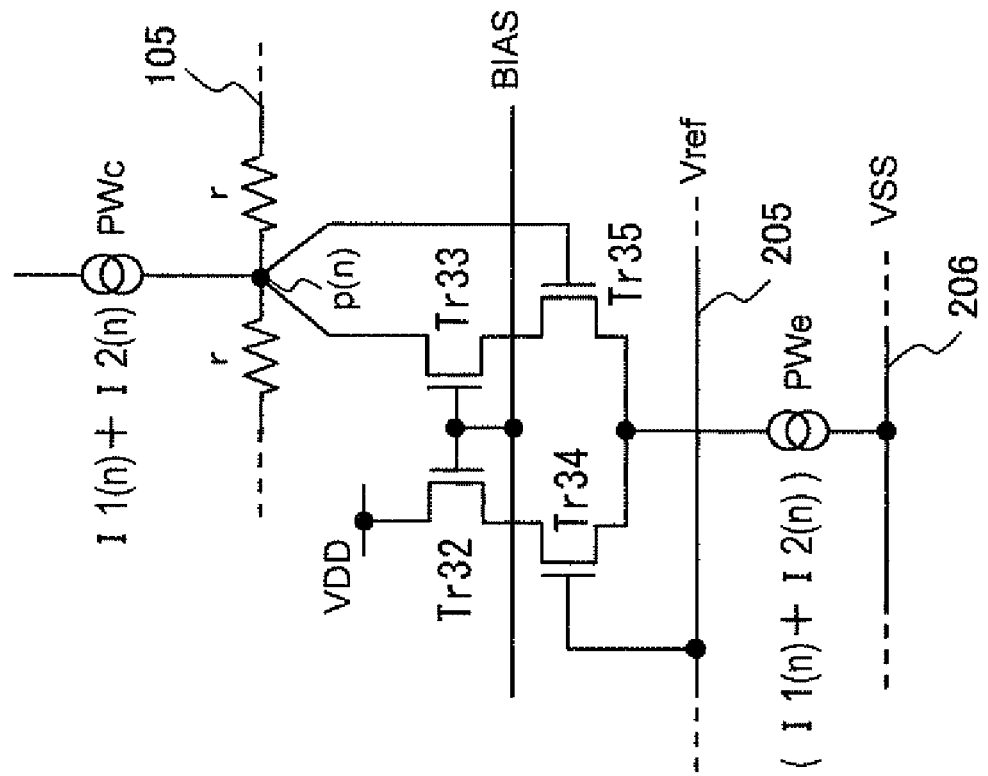
FIG. 11 is another example of equivalent circuit of the micro constant voltage generator CVS(y).
Figure 11:
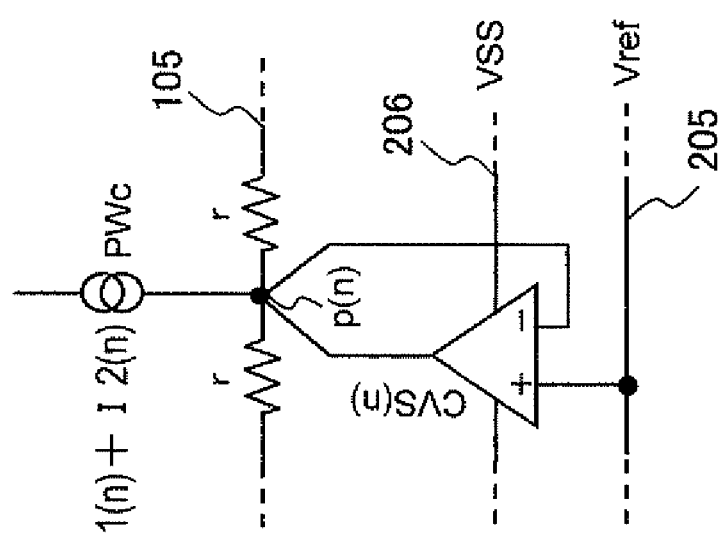

In FIG. 11, the micro constant voltage generator CVS(n) can be formed of a cascade type differential amplifier that includes a transistor Tr32, a transistor Tr33, a transistor Tr34, a transistor Tr35, and a constant current generator PWe. The transistor Tr32 and the transistor Tr33 form a first stage of the circuit, and a BIAS voltage is applied to gates of the respective transistors. Further, the transistor Tr34 and the transistor Tr35 form a second stage of the circuit, and an output electrical potential of the transistor 33 operates to be equal to the reference electrical potential Vref that is given to a gate of the transistor 34. At this time, the same load current (I1(*n*)+I2(*n*)) flows through the transistors 32, 34 and the transistors 33, 35, so that a current twice the load current 2·(I1(*n*)+I2(*n*)) flows through the constant current generator PWe.

As above, the micro constant voltage generator CVS(n) can be realized by the differential voltage follower circuit with a cascade structure, so that a constant voltage operation with higher accuracy can be realized, compared to the case of FIG. 10, resulting in that the variation in electrical potential of the virtual ground line 105 can be reduced.

Note that although the micro constant voltage generator CVS(n) is provided on the vertical signal line VLINE(n) for each of the columns in the aforementioned embodiment, it is also possible to provide the micro constant voltage generator on at least one vertical signal line of N number of vertical signal lines VLINE(n). For instance, even when the micro constant voltage generators are disposed at a certain interval, namely, at an interval of a plurality of, such as two, vertical signal lines VLINE, the same effect can be obtained.

As has been described above, the imaging device 101 according to the present embodiment can maintain an electrical potential of the pixel ground line PGND(y) to be a reference level of a signal of each pixel P(x,y) constant, regardless of column positions. Particularly, even when a high luminance subject exists in a shot image, the generation of electrical potential difference of the pixel ground lines PGND(y) between the columns which causes a smear can reduced, resulting in that an image with no horizontal smear can be obtained. Further, since the necessity to particularly reduce a resistance of the virtual ground line 105 is eliminated, a degree of freedom in designing a pattern of the imaging device 101 is increased, and a chip size can be reduced.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging device comprising:
pixels arranged in a two-dimensional form and each having a photoelectric conversion part converting light into an electric signal;
a plurality of vertical signal lines coupled, in a column direction, to the pixels arranged in the column direction and receiving the electric signal read from each of the pixels;
a first constant current generator provided on each of the vertical signal lines;
a column amplifier having a second constant current generator amplifying the electric signal read to each of the vertical signal lines; and
a constant voltage generator provided between the pixels and the column amplifier on each of the vertical signal lines, being coupled to a first contact of the first constant current generator and a second contact of the second constant current generator included in the column amplifier, and applying a reference voltage to the first contact and the second contact.

2. The imaging device according to claim 1, further comprising:
a virtual ground line disposed in a row direction across all columns of the pixels arranged in the two-dimensional form and to which the first contact of the first constant current generator, the second contact of the second constant current generator included in the column amplifier, and a pixel ground line of the pixels in the column direction are coupled for each of the columns;
a reference voltage line disposed in the row direction across all the columns of the pixels arranged in the two-dimensional form and applying a predetermined electrical potential to the constant voltage generator; and
a power line disposed in the row direction across all the columns of the pixels arranged in the two-dimensional form and supplying power to the constant voltage generator, wherein
the power line, the virtual ground line, and the reference voltage line are coupled to the constant voltage generator for each of the columns.

3. The imaging device according to claim 2, wherein
the constant voltage generator is a differential voltage follower circuit.

4. The imaging device according to claim 3, wherein
the differential voltage follower circuit has an output load current generator which is the first constant current generator.

5. The imaging device according to claim 4, wherein
the differential voltage follower circuit has an output load current generator which is the second constant current generator included in the column amplifier.

6. The imaging device according to claim 3, wherein
the differential voltage follower circuit has an output load current generator which is the second constant current generator included in the column amplifier.

7. The imaging device according to claim 1, wherein
the constant voltage generator is a differential voltage follower circuit.

8. The imaging device according to claim 7, wherein
the differential voltage follower circuit has an output load current generator which is the first constant current generator.

9. The imaging device according to claim 8, wherein
the differential voltage follower circuit has an output load current generator which is the second constant current generator included in the column amplifier.

10. The imaging device according to claim 7, wherein
the differential voltage follower circuit has an output load current generator which is the second constant current generator included in the column amplifier.

11. An imaging device comprising:
pixels arranged in a two-dimensional form and each having a photoelectric conversion part converting light into an electric signal;
a plurality of vertical signal lines coupled, in a column direction, to the pixels arranged in the column direction and receiving the electric signal read from each of the pixels;
a first constant current generator provided on each of the vertical signal lines;
a column amplifier having a second constant current generator amplifying the electric signal read to at least one of the vertical signal lines; and
a constant voltage generator provided between the pixels and the column amplifier on at least one vertical signal line of the vertical signal lines being coupled to a first contact of the first constant current generator and a second contact of the second constant current generator included in the column amplifier, and applying a reference voltage to the first contact and the second contact.

* * * * *